United States Patent
Braganza et al.

(10) Patent No.: US 11,966,575 B2
(45) Date of Patent: Apr. 23, 2024

(54) METHOD FOR RETRIEVING USER INPUT VIA AN INTERFACE BASED ON SELECTION OF INTERACTIVE SHAPES

(71) Applicant: MuchSkills AB, Gothenburg (SE)

(72) Inventors: Noel Braganza, Gothenburg (SE); Daniel Nilsson, Gothenburg (SE)

(73) Assignee: MuchSkills AB, Gothenburg (SE)

( * ) Notice: Subject to any disclaimer, the term of this patent is extended or adjusted under 35 U.S.C. 154(b) by 0 days.

(21) Appl. No.: 17/910,145

(22) PCT Filed: Mar. 9, 2020

(86) PCT No.: PCT/EP2020/056178
§ 371 (c)(1),
(2) Date: Sep. 8, 2022

(87) PCT Pub. No.: WO2021/180299
PCT Pub. Date: Sep. 16, 2021

(65) Prior Publication Data
US 2023/0096629 A1    Mar. 30, 2023

(51) Int. Cl.
*G06F 3/04847* (2022.01)
*G06F 3/0488* (2022.01)

(52) U.S. Cl.
CPC ........ *G06F 3/04847* (2013.01); *G06F 3/0488* (2013.01)

(58) Field of Classification Search
CPC ... G06F 3/04847; G06F 3/0488; G06F 3/0484
See application file for complete search history.

(56) References Cited

U.S. PATENT DOCUMENTS

| | | | |
|---|---|---|---|
| 5,844,558 A | 12/1998 | Kumar et al. | |
| 2010/0050120 A1* | 2/2010 | Ohazama | G06F 3/0482 715/815 |
| 2015/0067568 A1 | 3/2015 | Lee et al. | |

(Continued)

OTHER PUBLICATIONS

Scale—Wiktionary, the free dictionary. (article) [online]. Wiktionary.org. Retrieved on Aug. 22, 2023. https://en.wiktionary.org/wiki/scale (Year: 2023).*

(Continued)

*Primary Examiner* — John T Repsher, III
(74) *Attorney, Agent, or Firm* — Flaster Greenberg P.C.

(57) ABSTRACT

An interface may receive user input, wherein two or more interactive shapes are shown on the interface, wherein each interactive shape represents a query of scoring an attribute, and wherein a size parameter of a first of the two or more interactive shapes is indicative of the scoring of the represented attribute. The method comprises retrieving a user selection of one interactive shape of the two or more interactive shapes so that the one interactive shape becomes a selected master shape and the remaining of the two or more interactive shapes becomes non-selected slave shapes, retrieving a user request for increasing or decreasing of the size parameter of the selected master shape, and rescaling the size parameter of the non-selected slave shapes such that a sum of the size parameters of the two or more interactive shapes is kept at a constant value.

16 Claims, 3 Drawing Sheets

(56) References Cited

U.S. PATENT DOCUMENTS

2015/0355827 A1* 12/2015 Van Der Westhuizen ................... G06F 3/04842
　　　　　　　　　　　　　　　　　　　　　　　　　715/788
2017/0300212 A1* 10/2017 Vinna ................. G06F 3/04847

OTHER PUBLICATIONS

Recale—Wiktionary, the free dictionary. (article) [online]. Wiktionary. org. Retrieved on Aug. 22, 2023. https://en.wiktionary.org/wiki/rescale (Year: 2023).*

* cited by examiner

METHOD FOR RETRIEVING USER INPUT VIA AN INTERFACE BASED ON SELECTION OF INTERACTIVE SHAPES

CROSS-REFERENCE TO RELATED APPLICATIONS

This application is the 371 National Stage of International Application No. PCT/EP2020/056178, filed Mar. 9, 2020, the disclosure of which is incorporated herein by reference in its entirety.

TECHNICAL FIELD OF THE INVENTION

The present disclosure relates to a method and device for retrieving user input via an interface.

BACKGROUND

Human computer interaction is crucial for the input of correct information in digital devices, as the accuracy of the subsequent information processing in digital devices heavily depends on the quality of the input. The information may be in the form of numerical values, text strings, images or any arbitrary form of data. It remains a challenge to make information input and computer interaction intuitive, efficient, precise and engaging.

Especially within the field of assessing personal traits or professional skills recent development has stalled at the typical questionnaire-type surveys where a user is prompted to select a score on a set scale (e.g. 1-5) to provide answer what is deemed to best represents a particular statement.

A problem with the current solutions of assessing personal traits or professional skills is that they are unable to accurately and efficiently collect, and update information provided by the user. Surveys according to current solutions are often cumbersome and require multiple instances of statements to which the user must take a stand in order to collect data of sufficient quality to ensure accurate processing of that data.

SUMMARY OF THE INVENTION

In view of the shortcomings of the solutions discussed in the above, there is a need for a more accurate and efficient method of receiving user input data. Especially for providing an accurate and efficient method of receiving user input related to weighting multiple attributes against each other and providing feedback to users in substantially real time.

It is an object of the present invention to provide an improved method and device for accurately and efficiently receiving user input via an interface.

The invention is defined by the appended independent claims, with embodiments being set forth in the appended dependent claims, in the following description, and in the drawings.

According to a first aspect of the inventive concept, there is provided a method for retrieving user input via an interface,
wherein at least two interactive shapes are shown on said interface,
wherein each interactive shape represents a query of scoring an attribute,
and wherein a size parameter of a first of said at least two interactive shapes is indicative of the scoring of said represented attribute, the method comprising:
retrieving a user selection of one interactive shape of said at least two interactive shapes so that said one interactive shape becomes a selected master shape and the remaining of said at least two interactive shapes becomes non-selected slave shapes,
retrieving a user request for increasing or decreasing of said size parameter of said selected master shape,
increasing or decreasing said size parameter of said selected master shape, and
rescaling said size parameter of said non-selected slave shapes such that a sum of said size parameters of said at least two interactive shapes is kept at a constant value.

The present invention is at least partly based on the understanding that user input can be made more efficient and accurate if a size parameter of an interactive shape is utilized to represent scoring an attribute. By either increasing or decreasing a size parameter of a selected master shape (representing a particular attribute) and rescaling the non-selected slave shapes it is clear for a user how the scoring of all shown interactive shapes affect each other. Since the sum of the size parameters is kept constant, a user may manipulate only one interactive shape and accurately provide scoring for at least two interactive shapes in a single action. An interface may e.g. be a touchscreen interface, a desktop interface, a laptop interface or any digital or analogue interface wherein a user may input data and perceive at least a visual response. An interactive shape may be defined at least in part by the size parameter. By increasing, decreasing or rescaling a size parameter of an interactive shape it is understood that the interactive changes its size accordingly.

As an example, the at least two interactive shapes may each represent an attribute in the shape of a personal trait or professional skill. The method may receive input from a user and the resulting size parameter of each interactive shape will be indicative of e.g. self-assessment in terms of experience or performance of that skill or trait, in relation to the self-assessment of the skills or traits associated with the other interactive shapes. A user may select an interactive shape of the at least two interactive shapes so that it becomes a selected master interactive shape while the remaining of said at least two interactive shapes becomes non-selected slave shapes. A user may subsequently chose an interactive shape having previously been a slave shape to become a selected master shape.

According to some embodiments of the first aspect of the invention, there is provided a method, wherein said interactive shapes are interactive circles or interactive polygonals.

The at least two interactive shapes may be any shape wherein a size parameter may be defined. The interactive shape may be one-, two-, or three-dimensional. If the interactive shape is an interactive regular polygon or an interactive circle the size parameter may in an exemplary embodiment be the radius (of a circle) or half of the diagonal (of a regular polygon).

According to some embodiments of the first aspect of the invention, there is provided a method wherein said size parameter is chosen from a group comprising: width, height, radius, area, circumference, and diameter.

Moreover, the size parameter may be any length, area or volume that can be defined in an interactive shape. The size parameter may further be a side length, circumference, area or volume. The size parameter may be a product or sum of at least two sub size parameters forming the circumference, area or volume of an interactive shape.

According to some embodiments of the first aspect of the invention, there is provided a method wherein said interface is a touchscreen interface, wherein retrieving a user selection comprises a user touching an interactive shape, and wherein retrieving a user request for increasing or decreasing said size parameter of said selected master shape comprises a user pulling or tapping an interactive shape.

A touchscreen interface allows facilitated and efficient input of a user selection and a user request for increasing or decreasing a size parameter. A user pulling on a selected master shape may comprise a user first touching an interactive shape (thereby selecting it and making it a selected master shape) and then pulling (decreasing or increasing the size parameter). It is understood that a user may select and request increase or decrease in the same touch input. A user tapping may comprise a user touching an interactive shape and then rapidly releasing the interactive shape. A user tapping an interactive shape may comprise a user touching a shape and releasing within a pre-determined time interval. The selected master shape may change in size depending on how long time a user is touching the shape. The selected master shape may also change in size depending on how hard a user is touching the shape, if the touch screen is pressure sensitive. Further, peripheral equipment such as mice, smart pens or other input devices may be used for controlling the size parameter for a selected master shape.

According to some embodiments of the first aspect of the invention, there is provided a method wherein a user pulling in a first direction represents a request for decreasing and a user pulling in a second direction represents a request for increasing.

By linking a first direction with a user request to increase a size parameter and linking a second direction to a user request to decrease the size the user input may be intuitively and efficiently performed. The directions may be any directions. Preferably, the first direction is opposite directed relative to the second direction. In a further preferred embodiment the first direction is an upwards direction and the second direction is a downward direction. With an upward/downward direction it is meant a substantially upward/downward direction defined when considering how a user is expected to perceive the touchscreen interface. A direction associated with a request to increase may be defined as any direction within a 180°-angle from the touch location point and a direction associated with a request to decrease may then be any direction not within the aforementioned 180°-angle from the touch location point. As another example, a direction associated with a request to increase may be a right direction and a direction associated with a request to decrease may then be a left direction or vice versa.

According to some embodiments of the first aspect of the invention, there is provided a method wherein the method further comprises:

retrieving a user request for incremental increasing of said size parameter of said selected master shape.

An incremental increase is a discrete step-wise increase of an interactive shape. As an alternative to increasing or decreasing the incremental increase may be an efficient way of accomplishing a rough scoring of all attributes whose interactive shapes are shown. While the increasing or decreasing, which in some embodiments is done via touching and pulling, may be an efficient way of accomplishing fine tuning of the scoring of the attributes. If incremental is increase considered as a discrete way of increasing the size parameters of the interactive shapes, increasing or decreasing may be considered as a continuous way of increasing or decreasing a size parameter.

According to some embodiments of the first aspect of the invention, there is provided a method, wherein retrieving a user request for incremental increasing of said size parameter of said selected master shape comprises a user tapping an interactive shape of said at least two interactive shapes.

Thus, as tapping is distinct from touching and holding while pulling, a request for incremental increase is distinct from a request to increase or decrease. A user may thereby alternatively choose between tapping for incremental increase and touching while pulling for increasing or decreasing.

According to some embodiments of the first aspect of the invention, there is provided a method wherein incremental increasing comprises increasing the size parameter of said selected master shape with a fixed amount, wherein the fixed amount is between 20% and 10% of the size parameter of the selected master shape, and preferably about 15% of said size parameter of said selected master shape.

Incremental increase of a size parameter with a fixed amount between about 20% and 10%, and preferably about 15%, means that a user can efficiently and accurately input a desired scoring in pre-determined incremental steps.

According to some embodiments of the first aspect of the invention, there is provided a method, wherein said at least two interactive shapes shown on said interface are at least four interactive shapes shown on said interface, and wherein the method further comprises:

hindering any interactive shape from being increased such that its size parameter equals more than ½ or preferably ⅓ of said constant value.

By providing an upper limit for any size parameter the quality of the user input can be increased. With an upper limit for any size parameter situations where the scoring of one attribute dominates the other attributes shown on the interface can be avoided. The method inherently forces user input to make a score weighting between the attributes shown on the interface.

According to some embodiments of the first aspect of the invention, there is provided a method wherein said at least two interactive shapes shown on said interface are two interactive shapes shown on said interface, and wherein the method further comprises:

hindering any interactive shape from being increased such that its size parameter equals more than preferably ⅔ of said constant value.

According to some embodiments of the first aspect of the invention, there is provided a method wherein said interface is a digital display, and wherein said constant value is equal to $200+40*(N)^{(1/2)}$ number of pixels, wherein N is the number of interactive shapes shown on said digital display.

By limiting the total number of pixels, the method may effectively and accurately retrieve user input even as the number of interactive shapes is large. With this limit for the total number of pixels allowed in the constant the method may effectively adapt to smaller screen sizes. Thus, providing a method for retrieving user input which works effectively, even for large numbers of interactive shapes and small screen sizes.

According to some embodiments of the first aspect of the invention, there is provided a method wherein said rescaling is uniform in that each non-selected slave shape that is rescaled has its size parameter increased or decreased with the same amount.

The rescaling may be uniform in the sense that each non-selected slave is rescaled with the same number of pixels so that the total sum of pixels remains constant for a number of interactive shapes.

According to some embodiments of the first aspect of the invention, there is provided a method wherein the method further comprises:

moving said at least two interactive shapes relative to each other such that no two interactive shapes overlap.

By moving the interactive shapes relative to each other such that no two interactive shapes overlap the scoring of each attribute can be clearly represented. It is understood that the interactive shapes may move in substantially real time to accommodate that no two interactive shapes overlap as the size parameter of one selected master shape is increased or decreased, and the size parameter of every shown non-selected slave shape is rescaled. Similarly, the method may move the interactive shapes to accommodate this if a request for incremental increase has been received.

According to some embodiments of the first aspect of the invention, there is provided a method wherein the method further comprises:

moving said at least two interactive shapes relative to each other such that each interactive shape of said at least two interactive shapes is directly adjacent to another interactive shape.

Additionally, and/or alternatively, if the interface is a display interface the at least two interactive shapes may move relative to each other such that each interactive shape of said at least two interactive shapes is directly adjacent or within 5 pixels from at least one other interactive shape. It is understood that the interactive shapes may be moved in substantially real time to accommodate this as the size parameters of the interactive shapes is increased or decreased or rescaled. Similarly, the method may move the interactive shapes to accommodate this if a request for incremental increase has been registered.

According to a second aspect of the inventive concept, there is provided a device wherein the device is configured to perform the method according to the first aspect of the invention.

BRIEF DESCRIPTION OF THE DRAWINGS

These and other aspects of the present invention will now be described in more detail, with reference to the appended drawings showing exemplary embodiments of the present invention, wherein.

DETAILED DESCRIPTION

In the following detailed description, some embodiments of the present invention will be described. However, it is to be understood that features of the different embodiments are exchangeable between the embodiments and may be combined in different ways, unless anything else is specifically indicated. Even though in the following description, numerous details are set forth to provide a more thorough understanding of the present invention, it will be apparent to one skilled in the art that the present invention may be practiced without these details. In other instances, well known constructions or functions are not described in detail, so as not to obscure the present invention.

Figure 1:
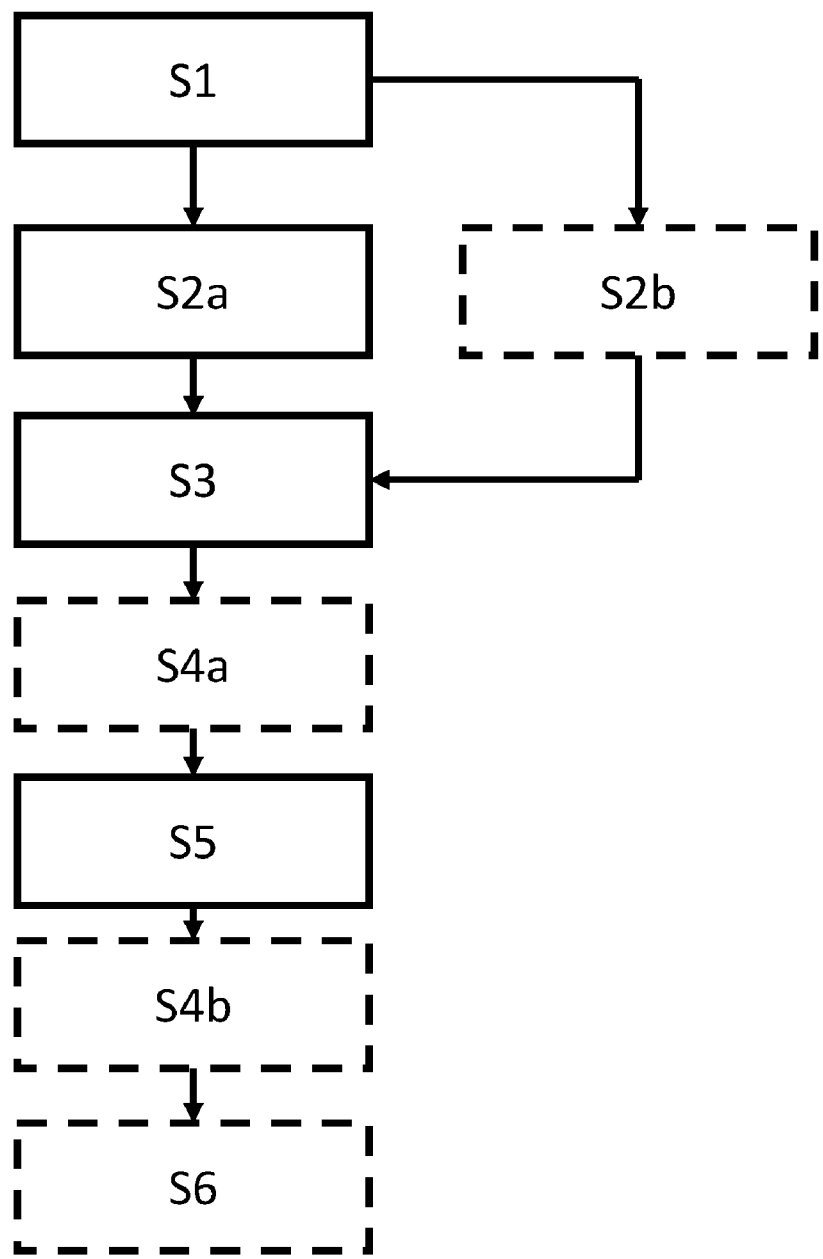
FIG. 1 is a flow chart of a method according to one or more embodiments of the invention.

FIG. 1 is a flow chart of a method according to embodiments of the invention. At S1 the method may retrieve a user selection of an interactive shape of said at least two interactive shapes. The method may then go to S2a where it retrieves a user request for increasing or decreasing of said size parameter of said selected master shape. The method may then continue to S3, or alternatively, S3 is performed substantially simultaneously as S2. At S3 the method increases or decreases the size parameter of the selected master shape depending on the user request obtained at S2. After S3 the method may go directly to S5, alternatively, S5 is performed preformed substantially simultaneously as S3. At S5 the method may rescale said size parameter of said non-selected slave shapes such that a sum of said size parameters of said at least two interactive shapes is kept at a constant value.

In some embodiments the method includes S2b as an alternative to S2a. At S2b the method retrieves a user request for incremental increasing of said size parameter of said selected master shape. As a response, the method may then go to S3 and continue according other embodiments of the inventive concept.

According to an aspect of the invention some embodiments of the method may comprise step S4a and S4b. At S4a and S4b the method may hinder any interactive shape from being increased such that its size parameter equals more than preferably ½ or preferably ⅓ of said constant value (should there be at least four interactive shapes shown on said interface). Alternatively, at S4a and S4b the method may hinder any interactive shape from being increased such that its size parameter equals more than preferably ⅔ of said constant value (should there be two interactive shapes shown on said interface).

It is clear that hindering any interactive shape from having its size parameter increase beyond a pre-determined value applies both to the rescaling procedure (S4b) and the increasing/decreasing/incremental increase procedure (S4a). The hindering procedure in step S4a may be performed simultaneously as S3 and the hindering procedure in step S4b may be performed simultaneously as S5. The hindering procedure in S4a and S4b may comprise hindering a size parameter from increasing once the size parameter has reached the pre-determined maximum value. In other words, the size parameter may not increase despite a request for increase of that size parameter is received at S2a or S2b. Equivalently, it should be understood that increase/decrease of any interactive shape may be hindered once any interactive shape has its size parameter reaching the pre-determined maximum value. This applies regardless if the size parameter reaching the maximum value does so due to the rescaling procedure in S5 or the increase/decrease/incremental increase procedure in S2a or S2b.

In some embodiments, the method may comprise step S6 wherein said at least two interactive shapes are moved relative to each other such that no two interactive shapes overlap. As an alternative, S6 may move the interactive shapes according to some other criteria. At S6 the at least two interactive shapes may be moved relative to each other such that each interactive shape of said at least two interactive shapes is directly adjacent to another interactive shape. Step S6 may be performed substantially simultaneously as S5 and S3.

The increase or decrease of the selected master shape together with the rescaling of the non-selected slave shapes in substantially real time provides visual feedback to a user. Moving of the interactive shapes in substantially real time further provides visual feedback for a user.

Figure 2:
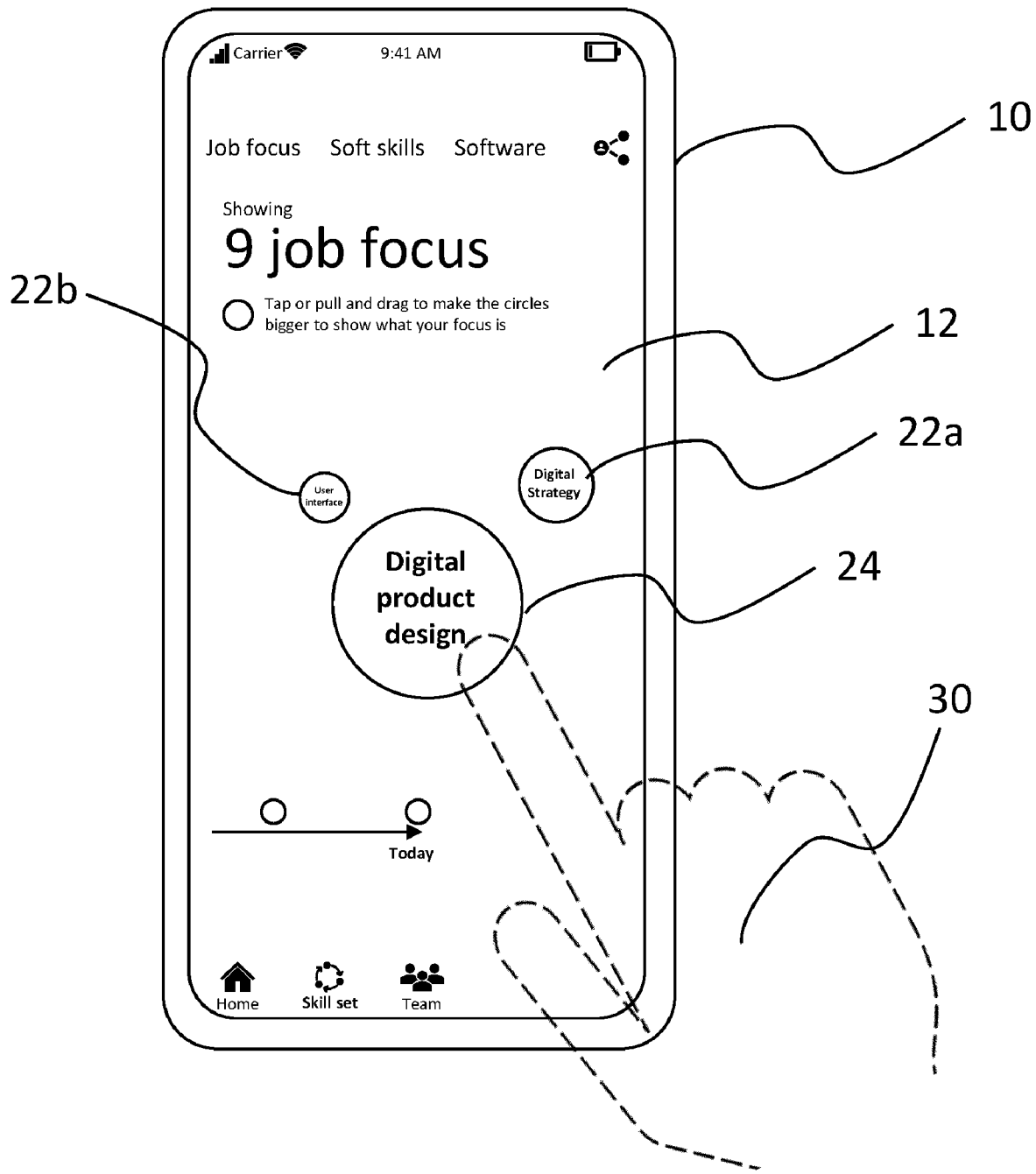
FIG. 2 illustrates a device implementing a method according to some embodiments of the invention, with 3 interactive shapes on the interface.

FIG. 2 schematically illustrates an embodiment according to an aspect of the invention. A device 10 is shown in an exemplary embodiment as a smartphone device. The device 10 may be any device 10 with an interface 12 adapted for retrieving user input and for providing at least visual feedback as an output. According to embodiments of the invention each of the at least two interactive shape 22a, 22b, 24 represents a query of scoring an attribute. An interactive shape 22a, 22b, 24 may be selected by a user 30, making it a selected master shape. A selected master shape 24 may further have its size parameter increased or decreased. Increasing or decreasing the size parameter of a selected master shape 24 may have the size parameter of the non-selected slave shapes 22a, 22b rescale such that the that a sum of said size parameters of said at least two interactive shapes 22a, 22b, 24 is kept at a constant value.

In some embodiments of the invention the at least two interactive shapes 22a, 22b, 24 are in the shape of polygons or circles.

The interface 12 may be a touch screen interface 12. A user 30 selecting an interactive shape may include a user touching an interactive shape 24. A user request for increasing or decreasing a size parameter of a selected master shape 24 may comprise a user 30 pulling or tapping an interactive shape 24. A user 30 pulling in an upward direction may represent a request to increase the size parameter of the selected master shape 24. A user 30 pulling in a downward direction may represent a request to decrease the size parameter of the selected master shape 24. Any interactive shape 24 may be requested by a user 30 to incrementally increase. A user 30 may select (making the shape a master shape) and request incremental increase of an interactive shape 22a, 22b, 24 with the same action. A user request for incremental increase may include a user 30 tapping on an interactive shape 22a, 22b, 24. A user tapping an interactive shape 22a, 22b, 24 may be regarded by the method of the invention as both retrieving a user selection and a user request for incremental increase. A user request for incremental increase of an interactive shape 22a, 22b, 24 may similarly be regarded by the method of the invention as both retrieving a user selection and a user request for incremental increase.

The interface 12 may be a screen interface 12. The aforementioned constant value may preferably be set to $200+40*(N)^{(1/2)}$ number of pixels, wherein N is the number of interactive shapes 22a, 22b, 24 shown on said screen interface 12. In other embodiments, the constant value may be set to $100+10*(N)^{(1/2)}$ number of pixels, or $400+80*(N)^{(1/2)}$ number of pixels. In some embodiments of the invention there is further provided the step of moving, across said interface 12, said at least two interactive shapes 22a, 22b, 24 relative to each other such that no two interactive shapes overlap 22a, 22b, 24. Additionally and/or alternatively, the method may comprise moving said at least two interactive shapes 22a, 22b, 24 relative to each other such that each interactive shape 22a, 22b, 24 of said at least two interactive shapes 22a, 22b, 24 is directly adjacent or adjacent to another interactive shape 22a, 22b, 24.

Figure 3:
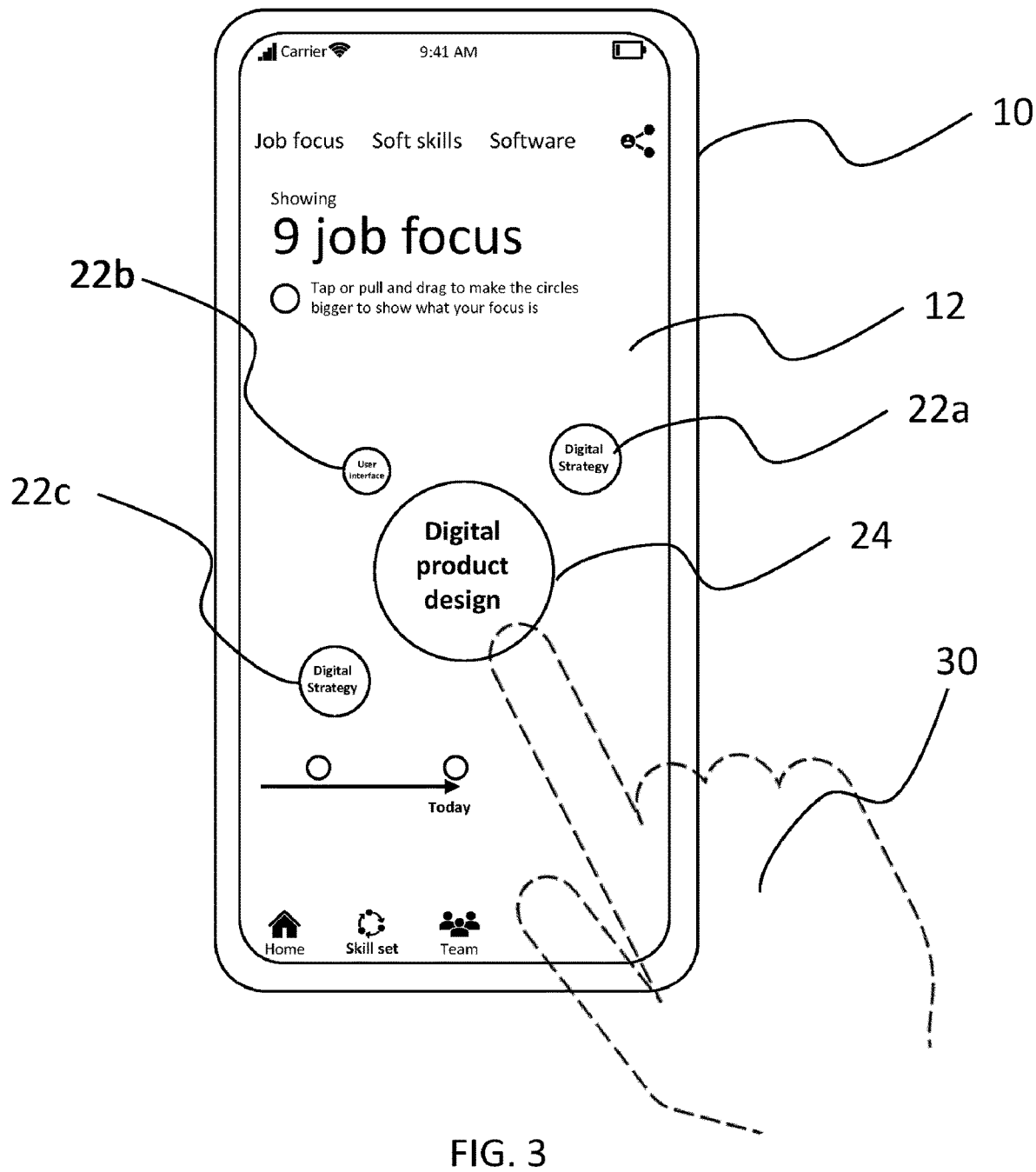
FIG. 3 illustrates a device implementing a method according to some embodiments of the invention, with 4 interactive shapes on the interface.

FIG. 3 illustrates some embodiments of the invention, wherein the at least two interactive shapes 22a, 22b, 22c, 24 shown on said interface 12 are at least four interactive shapes 22a, 22b, 22c, 24 shown on said interface 12. With at least four interactive shapes 22a, 22b, 22c, 24 shown on said interface 12 some embodiments of the method further comprise hindering any interactive shape from being increased such that its size parameter equals more than ½ or preferably ⅓ of said constant value.

The number interactive shapes illustrated in the FIG. 2 and FIG. 3 is merely exemplary. A person skilled in the art realizes that the number of interactive shapes is two or any integer larger than two. The skilled person in the art further realizes that the present invention by no means is limited to the embodiments described above. The features of the described embodiments may be combined in different ways, and many modifications and variations are possible within the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements.

What is claimed is:

1. A method for retrieving user input via an interface that is a digital display, and wherein two or more interactive shapes are shown on the interface, wherein each of the two or more interactive shapes represents a query of scoring an attribute, and wherein a first size parameter of a first of the two or more interactive shapes is indicative of the scoring of a represented attribute, the method comprising:
   retrieving a user selection of one interactive shape of the two or more interactive shapes so that the one interactive shape becomes a selected master shape and a remaining one or more interactive shapes becomes non-selected slave shapes;
   retrieving a user request for increasing or decreasing of a second size parameter of the selected master shape;
   increasing or decreasing the second size parameter of the selected master shape; and
   rescaling a third size parameter of the non-selected slave shapes such that a sum of size parameters of the two or more interactive shapes is kept at a constant value, wherein the constant value is equal to $200+40*(N)^{(1/2)}$ number of pixels, wherein N is a number of interactive shapes shown on the digital display.

2. A method according to claim 1, wherein the two or more interactive shapes are interactive circles or interactive polygonals.

3. A method according to claim 1, wherein the first, second, and third size parameters are chosen from a group consisting of: width, height, radius, area, circumference, and diameter.

4. A method according to claim 1, wherein said interface is a touchscreen interface, wherein retrieving the user selection comprises a user touching an interactive shape, and wherein retrieving the user request for increasing or decreasing of the second size parameter of the selected master shape comprises a user pulling or tapping the interactive shape.

5. A method according to claim 4, wherein the user pulling in a first direction represents a request for decreasing and the user pulling in a second direction represents a request for increasing.

6. A method according to claim 1, wherein the method further comprises:
   retrieving a user request for incremental increasing of the second size parameter of the selected master shape.

7. A method according to claim 6, wherein retrieving the user request for incremental increasing of the second size parameter of the selected master shape comprises a user tapping an interactive shape of the two or more interactive shapes.

8. A method according to claim 6, wherein the incremental increasing comprises increasing the second size parameter of the selected master shape with a fixed amount, wherein the fixed amount is between 20% and 10% of the second size parameter of the selected master shape.

9. A method according to claim 1, wherein the two or more interactive shapes shown on the interface are four or more interactive shapes shown on the interface, and wherein the method further comprises:
 hindering an interactive shape from being increased such that a respective size parameter equals more than one half of the constant value.

10. A method according to claim 1, wherein the two or more interactive shapes shown on the interface are two interactive shapes shown on the interface, and wherein the method further comprises:
 hindering an interactive shape from being increased such that a respective size parameter equals more than ⅔ of the constant value.

11. A method according claim 1, wherein the rescaling is uniform in that each of the respective third size parameters of the non-selected slave shapes that are rescaled is increased or decreased with a same amount.

12. A method according to claim 1, wherein the method further comprises:
 moving the two or more interactive shapes such that no two interactive shapes overlap.

13. A method according to claim 1, wherein the method further comprises:
 moving the two or more interactive shapes such that each interactive shape of the two or more interactive shapes is directly adjacent to another interactive shape.

14. A device comprising an interface that is a digital display adapted for retrieving user input, wherein two or more interactive shapes are shown on the interface, wherein each of the two or more interactive shapes represents a query of scoring an attribute, and wherein a first size parameter of a first of the two or more interactive shapes is indicative of the scoring of a represented attribute, and wherein the device is configured to:
 retrieve a user selection of one interactive shape of the two or more interactive shapes so that the one interactive shape becomes a selected master shape and a remaining one or more interactive shapes becomes non-selected slave shapes;
 retrieve a user request for increasing or decreasing of a second size parameter of the selected master shape;
 increase or decrease the second size parameter of the selected master shape; and
 rescale a third size parameter of the non-selected slave shapes such that a sum of size parameters of the two or more interactive shapes is kept at a constant value, wherein the constant value is equal to $200+40*(N)^{(1/2)}$ number of pixels, wherein N is a number of interactive shapes shown on the digital display.

15. A method according to claim 6, wherein the incremental increasing comprises increasing the second size parameter of the selected master shape with a fixed amount, wherein the fixed amount is 15% of the second size parameter of the selected master shape.

16. A method according to claim 1, wherein the two or more interactive shapes shown on the interface are two interactive shapes shown on the interface, and wherein the method further comprises:
 hindering an interactive shape from being increased such that a respective size parameter equals more than ⅓ of the constant value.

\* \* \* \* \*